United States Patent
Auslander et al.

(10) Patent No.: US 7,584,891 B2
(45) Date of Patent: Sep. 8, 2009

(54) BLACK FLUORESCENT OPTICAL CODES AND PROCESS FOR PRINTING AND READING

(75) Inventors: Judith D. Auslander, Westport, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 263 days.

(21) Appl. No.: 11/311,054

(22) Filed: Dec. 19, 2005

(65) Prior Publication Data

US 2007/0138285 A1 Jun. 21, 2007

(51) Int. Cl.
*G06K 9/18* (2006.01)
(52) U.S. Cl. .............................. 235/462.09; 235/462.01; 235/462.1
(58) Field of Classification Search ............ 235/462.09, 235/462.01, 462.1, 494, 491, 468, 462.06; 705/405, 408, 401
See application file for complete search history.

(56) References Cited

U.S. PATENT DOCUMENTS

| | | | |
|---|---|---|---|
| 6,604,682 B2 * | 8/2003 | Wakamiya et al. | 235/462.01 |
| 6,701,304 B2 * | 3/2004 | Leon | 705/401 |
| 7,213,757 B2 * | 5/2007 | Jones et al. | 235/462.01 |
| 2003/0116630 A1 * | 6/2003 | Carey et al. | 235/462.09 |
| 2004/0028258 A1 * | 2/2004 | Naimark et al. | 382/103 |
| 2004/0169847 A1 * | 9/2004 | Dukler | 356/71 |
| 2005/0269416 A1 * | 12/2005 | Sussmeier et al. | 235/494 |
| 2005/0279235 A1 * | 12/2005 | Barthram et al. | 101/483 |
| 2005/0279249 A1 * | 12/2005 | Auslander et al. | 106/31.32 |
| 2006/0255163 A1 * | 11/2006 | Bian | 235/494 |

FOREIGN PATENT DOCUMENTS

WO 0250802 A2 6/2002

* cited by examiner

*Primary Examiner*—Edwyn Labaze
(74) *Attorney, Agent, or Firm*—Charles R. Melandra, Jr.; Angelo N. Chaclas

(57) ABSTRACT

Disclosed are optical codes, e.g., DataMatrix bar codes, of enhanced security and readability and a process for printing one. These codes are comprised of a perimeter finder pattern providing a target area and a pattern of symbology defining a data field in fixed position relative to the target area. Preferably, at least a portion of the optical code so defined is printed in a black fluorescent ink in order to enhance the signal to noise ratio in the environment of other visible, monochrome printing. The invention simplifies the detection of the machine-readable symbology for reading by optical code reader and provides enhanced security features. The image is a covert composite of a visible light readable and a fluorescent image. If fluorescent image is not detected or does not match a reference image, then it can be rejected as an unauthentic, e.g., simple copy image.

3 Claims, 2 Drawing Sheets

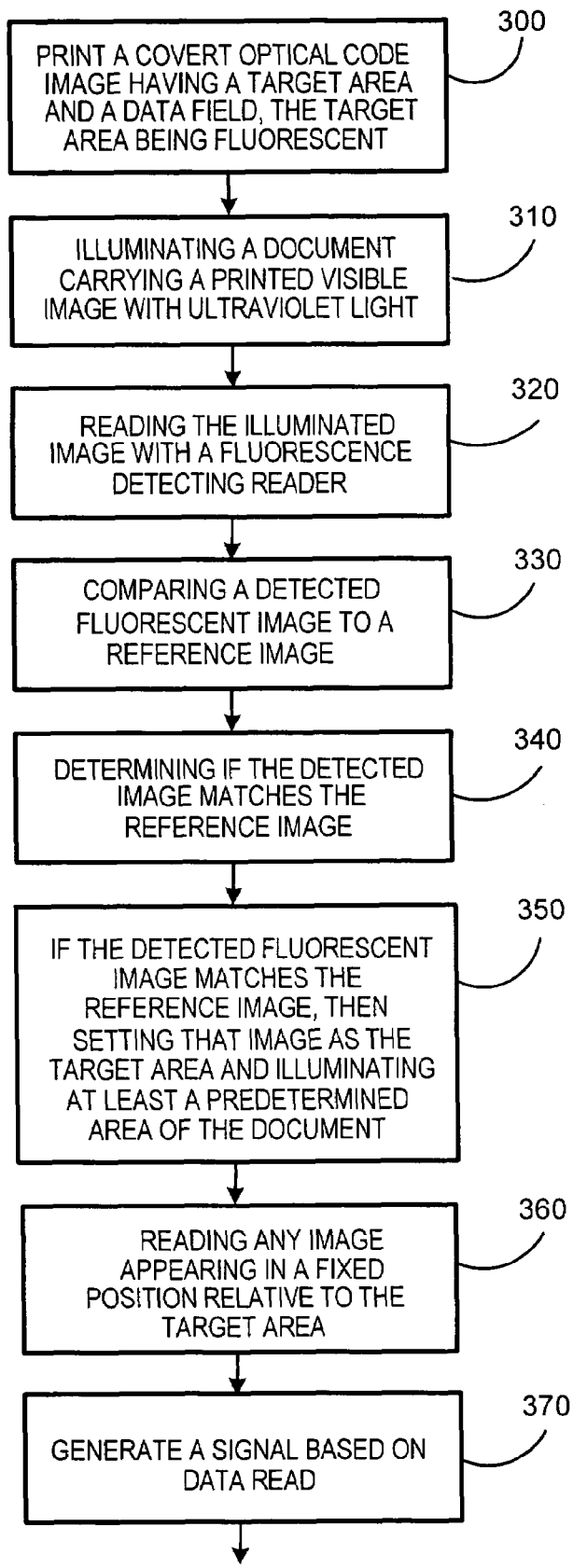

BLACK FLUORESCENT OPTICAL CODES AND PROCESS FOR PRINTING AND READING

BACKGROUND OF THE INVENTION

The invention relates to optical codes, e.g., DataMatrix bar codes and to making them more secure and easier to be detected and read. The invention greatly simplifies the detection of the machine-readable symbology for reading by a bar code reader.

Optical codes are used in a wide variety of contexts, including product packaging, mail sorting, and inventory control, among others. Optical codes take the form of visible or machine-readable patterns made up of image areas having different light reflective or light emissive properties which conform to defined rules. A "bar code" is a type optical code, and typically comprises a printed pattern of geometrical shapes in one-dimensional or two-dimensional patterns.

Among frequently employed optical codes are those based on two-dimensional grids, having a geometry independent of data content. The grid may be a plane tiled by regular polygons such as squares or hexagons. Typically, a black or white feature or polygon is located at each grid location.

DataMatrix bar codes are a form of optical codes used for many data intensive applications and often find security a desired feature. Because they depend on machine reading, it is important to provide a pattern and printing method that assure proper recognition and accurate reading at high throughputs. There is a present need for systems that can provide enhanced security and/or readability.

The optical properties and patterns of optical codes are selected to distinguish them in appearance (or machine readability) from the background environments in which they are used. Devices for identifying or extracting data from optical codes are sometimes referred to as "optical code readers" of which DataMatrix bar code scanners are one type, and they are used in both fixed and portable installations. An optical code should be easily recognized and rapidly read to provide rapid data entry for data base generation or real-time operation of article manipulating equipment, e.g., sorters. To assure rapid pattern recognition and accuracy of reading the codes, optical code readers are typically provided with a target code and connected to data processing device or a data collection and transmission device.

A DataMatrix barcode typically comprises a two-dimensional matrix symbology made up of nominally square modules arranged within a perimeter finder (target) pattern. The perimeter will be distinctive in geometry to permit easy detection, discrimination from background printing or other markings, and reading for location and orientation. Though primarily shown and described as a dark symbol on light background, DataMatrix symbols can also be printed to appear as light on dark. The symbols can be read or made recognizable by light reflectance or by fluorescence by selection of the appropriate ink.

Manufacturers of optical code printing and reading equipment and users of the technology require publicly available standard symbology specifications to which they can refer when developing equipment and application standards. The publication of standardised symbology specifications is designed to achieve this. In all cases, the images should be easily recognized by machine reading equipment and should enable rapid reading with high accuracy. It would be desirable to have an improved system that could utilize standard equipment for printing and reading and could also take advantage of equipment improvements to enhance security and/or readability.

DataMatrix bar codes comprise one particularly useful form of optical code and are typically provided with enhanced readability by the use of a distinctive perimeter pattern which provides a target area around a DataMatrix pattern including the principal data source. Due to any number of factors involved with printing and subsequent handling, the signal to noise ratio in the environment of other visible, monochrome printing is often problematic when printed with monochromatic inks for reflective reading with light in the visible range.

One of the most time consuming (or data processing intensive) parts of reading a barcode or other machine-readable symbology is detecting the symbol. This portion of the reading process must be complete and assured accurate before the data within the DataMatrix can be read and analyzed for many applications. There is a real need to simplify the symbol detection process and to assure that the data is being read properly.

A further problem with the art is identifying simple copies of an original barcode. Simple copies are any copies produced by a scanner and office printer or by a photocopier. In the context of tickets, postage and the like, there is often a need to read these bar codes with small hand held equipment for verification and there is a great need for simplicity and accuracy. There is a real need to assure that the data is being read from an authorized document and not a simple copy.

Security is important in many contexts, and the art has provided a number of inks for making documents more secure. For example in U.S. Pat. No. 6,835,326 to Barbera-Guillem there is described a fluorescent ink composition comprising functionalized fluorescent nanocrystals. In another approach described in U.S. Pat. No. 6,770,687 to Tan, et al., a water-based security printing ink is provided with two means of security. The use of a variable light absorbing and/or transmitting pigment or dye is a first security and a water repelling agent is provided as a second security. Visible images can be generated from the printed ink upon exposure to UV or infrared light. The water repelling agent renders the image waterproof and differentiates the printed image from the substrate, which allows the image to be detected upon exposure to water or other aqueous mixture.

Black fluorescent inks have also been described as having a desirable security feature. Among these are as photosensitive optically variable inks, a term used to define inks that can provide printed visually black or dark grey machine-readable information-bearing markings that fluoresce in a specific wavelength range when excited with a shorter wavelength light. The printed images exhibit visual light absorption throughout the entire visual spectrum including the red region of the visible spectrum where red inks are invisible to typical automatic scanning systems. Inks representative of this type are described, for example in U.S. Pat. No. 6,793,723 to Auslander, et al., entitled Homogeneous Photosensitive Optically Variable Ink Compositions For Ink Jet Printing and U.S. Pat. No. 6,827,769, also to Auslander, et al., and entitled Photosensitive Optically Variable Ink Heterogeneous Compositions For Ink Jet Printing. It would be desirable to have processes that can take advantage of inks possessing unique security features in ways that can enhance the detection and/or security of optical codes such as DataMatrix and other bar codes.

There is a need in the art of optical codes, e.g., DataMatrix bar codes, printing and processing to simplify the symbol detection process for postal and other purposes and also to enable identification of simple copies of an original barcode or other optical code, both to be enabled for automatic equipment for verification with simplicity and accuracy.

BRIEF DESCRIPTION OF THE INVENTION

It is an object of invention to provide improvements in the art of optical code printing and processing.

It is a further object of the invention to simplify the optical code symbol detection process for postal and other purposes.

It is yet another object of the invention to enable identification of simple copies of an original optical code, especially a DataMatrix bar code.

It is a yet further object of preferred aspects of the invention to enable both identification of simple copies and to simplify the symbol detection process for postal and other purposes, especially for DataMatrix bar codes.

It is a yet further object of preferred aspects of the invention to enhance the signal to noise ratio for at least a portion of an optical code, e.g., a DataMatrix bar code, in the environment of other visible, monochrome printing, to enable the code to be easily identified and located by automated equipment.

It is an object of the invention to provide new processes effective for security marking with optical codes, especially DataMatrix bar codes, and to provide better readability by OCR equipment.

These and other objects are accomplished by the invention, which provides optical codes, e.g., DataMatrix bar codes, of enhanced security and/or readability and processes for printing and reading them.

The optical codes of the invention, preferably, DataMatrix codes, comprise: a finder pattern which defines a target area and a pattern of symbology defining a data field in fixed position relative to the target area, wherein the finder pattern comprises a distinctive pattern and at least a predetermined portion thereof is printed in a fluorescent ink having a predetermined visible color, and the symbology defining said data field is printed in an ink of the same visible color as the finder pattern. The finder pattern forming the target area will preferably be a perimeter pattern of distinctive and, preferably, standardized format.

The process for printing optical codes of the invention, preferably, DataMatrix codes, comprises: printing at least a predetermined portion of a distinctive finder pattern as a target area in fluorescent ink having a predetermined visible color in order to provide a target image having an enhanced signal to noise ratio; and printing a symbology defining said data field in fixed position relative to the target area and in an ink of the same visible color as the finder pattern.

The process for reading the optical codes of the invention, preferably, DataMatrix codes, comprises: illuminating a document carrying a printed visible image with ultraviolet light; read the image with a fluorescence detecting reader; comparing a detected fluorescent image to a reference image; determine if the detected fluorescent image matches the reference image; if the detected fluorescent image matches the reference image, then setting that image as the target area and illuminating at least a predetermined area of the document; and reading any image appearing in a fixed position relative to the target area.

The invention has a number of preferred aspects, many of which are described below and shown in the accompanying drawings.

BRIEF DESCRIPTION OF THE DRAWINGS

The invention will be better understood and its advantages will become more apparent from the following description, especially when read in light of the accompanying drawing, wherein:

FIG. 3 is a schematic process flow diagram illustrating one preferred process sequence according to the invention.

DETAILED DESCRIPTION OF THE INVENTION

The invention relates to improving the technology of printing and reading optical codes, such as DataMatrix bar codes and, particularly, to making them more secure and/or easier to be detected and read. The invention greatly simplifies the detection of the machine-readable symbology for reading by a bar code or other optical reader.

The invention will be described herein with regard to exemplary illustrative optical codes, inks and techniques, but it will be clear to the person skilled in the art that a wide number of equivalents and variations can be applied while being faithful to the exemplary teachings of the invention provided. In its broad aspects, the invention provides a process for printing an optical code of any type, including any of those that contain a target area and a data area printed in fixed relation to the target. Prominent among these are DataMatrix bar codes comprised of a finder pattern which defines a target area and a pattern of symbology defining a data field in fixed position relative to the target area, wherein the finder pattern comprises a distinctive pattern and at least a predetermined portion thereof is printed in a fluorescent ink having a predetermined visible color, and the symbology defining said data field is printed in an ink of the same visible color as the finder pattern. The finder pattern forming the target area will preferably be a perimeter pattern of distinctive and, preferably, standardized format. In preferred forms, at least a portion of the bar code perimeter is printed in a black fluorescent ink. The use of preferred inks can further enhance the signal to noise (S/N) ratio, especially an advantage in the environment of other visible, monochrome printing.

Figure 1:
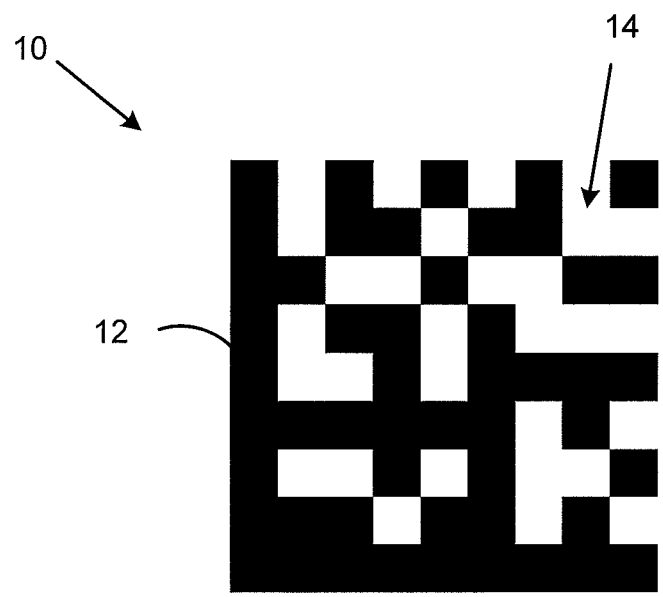
FIG. 1 illustrates a visible image according to the invention of a DataMatrix bar code comprised of a perimeter finder pattern, providing a target area, and a DataMatrix within the perimeter finder pattern, printed with a black fluorescent ink.
Figure 2:
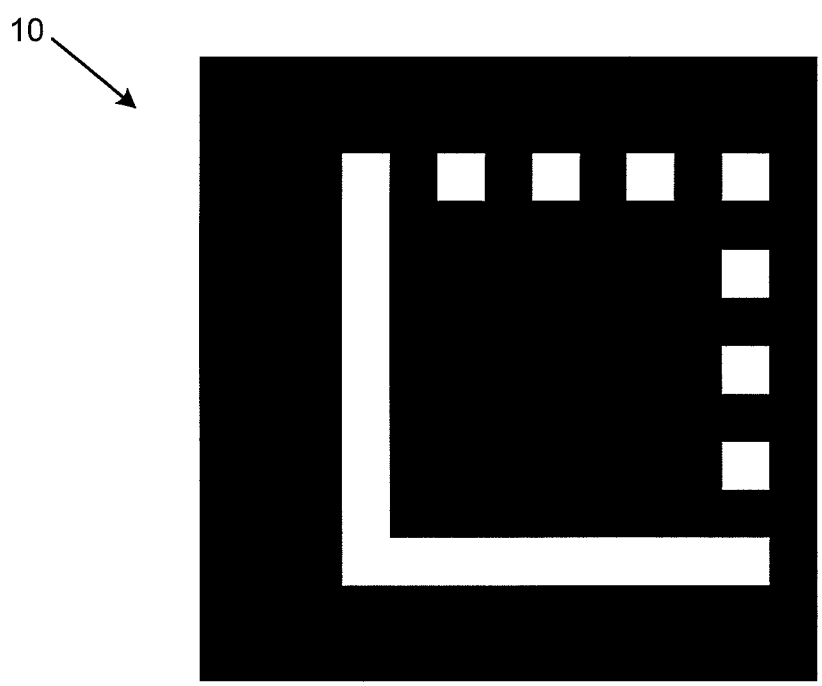
FIG. 2 illustrates the same image as in FIG. 1, illuminated with ultraviolet light to clearly show a machine readable target defining perimeter finder pattern.

FIG. 1 and FIG. 2, both illustrate barcodes, which like most other symbology, comprise two parts: data and a target. FIG. 1 illustrates a visible image according to the invention of a DataMatrix bar code 10 comprised of a perimeter finder pattern 12, providing a target area, and a pattern of symbology defining a data field 14 in fixed position relative to the target area. The DataMatrix code in FIG. 1, is preferably printed in black, with the target area printed in black fluorescent ink, of the type described below. FIG. 2 illustrates the same image as in FIG. 1, illuminated with ultraviolet light to clearly show a machine readable target defining perimeter finder pattern 12. In this exemplary situation, the data field 14 is not illuminated because it is printed, preferably, in a regular ink of the same color as that used for the target area 12.

The target area 12 is a set of characteristic image features generally used to parse the symbology, that is to detect, size, locate and orient the symbology. A preferred embodiment of this invention uses black fluorescent ink to print the target 12. The fluorescent image is not obfuscated by any surrounding features or symbol data. The fluorescent image thus makes it much easier to parse the symbol. The fluorescent target 12 will not show up in a simple copy of the symbol, and the system will not detect the copy. The target 12, preferably the perimeter, is preferably distinctive, with features that identify top, bottom and sides of target area containing data to be read. Experiments show that fluorescent barcodes show up as a bright image against a very dark background. Posts frequently use one-dimensional fluorescent barcodes. This invention uses a symbol which can be read as usual by a camera which detects the image in reflection. The fluorescent image helps a scanner provided with a fluorescence detector to parse and to authenticate the symbol.

The process of the invention thus calls for printing covert composite images. The images are printed with colored non-fluorescent and same color fluorescent inks. The images can be printed with monochrome inks: one color or multiple colored inks non fluorescent combined with fluorescent of the same color. Preferably, the target area 12 of the bar or other optical code is printed with black fluorescent ink in order to enhance the S/N ratio in an environment of other visible, monochrome printing such as address, ad slogan in mailing or shipping. Printing in this manner has the advantage of avoiding unnecessarily providing extra space for targeting that can be used to include data. Also the covert features of the fluorescent ink can be used for authentication. As another advantage, a combination of black and black fluorescent ink (BFI) can be read with a regular scanner with an additional UV or blue excitation lamp.

The images of the invention are printed, preferably by inkjet printing, but can be printed in any suitable equipment. Inkjet printing has several advantages, including the ability to use plural inks from standard equipment and to rapidly change the information inserted into a data field. In one preferred form, the process for printing optical codes of the invention, preferably, DataMatrix codes, comprises: printing at least a predetermined portion of a distinctive finder pattern as a target area 12 in fluorescent ink having a predetermined visible color in order to provide a target image having an enhanced signal to noise ratio; and printing a symbology defining said data field 14 in fixed position relative to the target area and in an ink of the same visible color as the finder pattern.

The preferred form of BFI ink formulations for use in the invention are described in several recent patents and patent applications. See for example, U.S. Pat. No. 6,793,723 to Auslander, et al., entitled Homogeneous Photosensitive Optically Variable Ink Compositions For Ink Jet Printing and U.S. Pat. No. 6,827,769, also to Auslander, et al., and entitled Photosensitive Optically Variable Ink Heterogeneous Compositions For Ink Jet Printing. See also, U.S. patent applications Ser. Nos. 10/873319, 10/873320 and 10/873321, each having a filing date of Jun. 22, 2004. The disclosures of all of these are incorporated herein by reference.

In general, the invention provides practical application of the fact that for these inks, the contrast obtained in a negative mode (through fluorescence) is higher and more reliable than in the reflectance mode. This is because the substrate is not reflective and does not vary in terms of contrast as much as in the fluorescence mode. The term "photosensitive optically variable" means that the inks can provide a printed visually black or dark gray machine-readable information-bearing marking that fluoresces in a specific wavelength range when excited with a shorter wavelength light. The printed images exhibit visual light absorption throughout the entire visual spectrum including the red region of the visible spectrum where red inks are invisible to typical automatic scanning systems.

It is an advantage of the invention that when a target area of an optical code, such as a DataMatrix bar code, is printed in the field of postage evidencing, there can be provided a black target indicium that fluoresces in the red region of the spectrum when illuminated with ultraviolet light and provides a highly readable target image.

The preferred ink compositions employed in the invention employ a first colorant comprising fluorescent pigment or dye mixtures (soluble and/or embedded dyes) and a second colorant having overlapping or longer wave length absorbing colorants (dyes and/or pigments). The combination gives a dark, preferably black or grey visible ink image, which also produces a detectable coincident fluorescent image.

The preferred inks for implementation of the invention will comprise at least two distinct colorant portions to achieve the objectives of coincident visible, fluorescent and phosphorescent images with characteristic properties. A first colorant potion will comprise a fluorescent pigment and/or dye emitting light within a characteristic emission band when excited by fluorescent-exciting radiation. Red fluorescence is preferred. The fluorescent dye will be present in the formulation in concentration effective to provide both a necessary contribution to the visible color of the ink and to provide a machine detectable fluorescent image. Among the suitable fluorescent dyes for the first colorant are those dyes meeting the objectives herein described in the aforementioned U.S. Pat. Nos. 6,793,723 and 6,827,769 and the aforementioned copending U.S. patent application Ser. No. 10/873319 entitled, Photosensitive Optically Variable Ink Compositions Useful for Ink Jet Printing. Thus, the process of the invention can utilize water soluble as well as polymer embedded fluorescent dyes. The noted publications list representative compositions and illustrate and describe concentrations for use. The disclosure of this technical detail is hereby incorporated by reference.

Among preferred water soluble fluorescent dyes are those characterized by red fluorescence and a suitably intense visible color to provide a dark color to the ink in the ink composition. The most preferred of this class have visible colors ranging from red to green and are fluoresce by emitting light within the range of from 500 to 680 nm. Preferred yellow or orange fluorescent dye components (FY) may be based on the chromophoric systems such as anionic coumarins, cationic coumarins, anionic naphthalimide dyes, pyranine (anionic pyrene dye), neutral, anionic and cationic perylene dyes, and anionic xanthene dyes. Some preferred yellow or orange fluorescent dyes are anionic coumarines, cationic coumarines, courmarine sulfonic acid, anionic napthalimide, neutral perylene, cationic perylene, anionic pyronine, and anionic napthalimide dyes, as illustrated for example in FIG. 13 of U.S. Patent Publication No. 2002/0195586. Among the useful red and purple fluorescent dyes are anionic xanthene dyes, bispyrromethane boron complexes, cationic and zwitterionic pyronines and sulphorhodamine B (SRB), as illustrated for example in FIG. 14 of the aforementioned U.S. Pat. No. 6,793,723. Acid Red 52 is a suitable water-soluble magenta dye. Acid Red 52 dye has satisfactory solubility in water but a very low water fastness as normally employed. Thus, a disadvantage of the magenta Acid Red 52 dye is that the ink containing such dye bleeds when exposed to water. Also among the useful yellow and orange dyes are acid yellow 7, coumarin sulfonic acid, cationic coumarins, anionic coumarins, neutral, anionic and cationic perylene dyes, anionic naphthalimide dyes and pyranine dyes. An important feature of these dyes is their ability to form a dark colored ink with good fluorescent properties. These and the other ones identified in the aforementioned U.S. Pat. No. 6,827,769 can be employed as effective.

In order to achieve a black ink, the colorant mixture must absorb across the entire visible spectrum, from 390 nm to ca. 1200 nm. To obtain simultaneous red fluorescence in ultraviolet light in the desired region of 580-630 nm, the composition must absorb fluorescence exciting radiation, e.g., UV light, efficiently and fluoresce efficiently, preferably between 580 and 630 nm. The first colorant dye (or dyes) is selected to meet these criteria in combination with the second colorant of the invention which comprises a colloidal pigment alone or with a dye having a light absorption band at longer wavelengths than the characteristic emission band of the first colorant or also overlapping the emission wavelength of the first colorant in such a way as to result in a dark color, preferably black.

The second colorant will be present in the formulation in concentration effective to provide a necessary contribution to the visible color of the ink without preventing machine detectable fluorescent image. The second colorant can be any of the dyes and/or pigments described in the aforementioned U.S. Pat. Nos. 6,793,723 and 6,827,769, and the aforementioned copending U.S. patent application Ser. No. 10/873319. The inks of the invention typically employ the second colorant at concentrations (based on the weight of dry solids) of from about 1 to about 5%, more narrowly, from 2 to 4%, by weight of this second colorant in the ink composition as applied. The dyes and/or pigments will have characteristic penetrations into paper and preferred members of the group will not significantly lose definition due to water wetting after printing by inkjet printing.

Among the colorants suitable for use in the second colorant of the inks of the invention the water dispersible colloidal pigments, as described, for example, in U.S. Pat. No. 6,494,943 to Yu, et al. The pigments described broadly by the Yu, et al. patent are identified as colored pigments having one or more desired parameters and/or properties are described. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25° C. for at least one week. Similarly, the preferred pigments of the invention can be characterized as having one or more of these properties. In addition to these pigments are those that require dispersants to remain stable. One preferred colloidal pigment is available from Cabot Corporation as Cabot Blue Pigment Dispersion, Cyan COJ 250. Pigments of this type will not bleed to the extent of dyes, yet in the formulations of the invention will provide a penetration and water fastness highly desirable for security and other value metered markings. In addition to these pigments, carbon black of suitable characteristics can be employed in minor amount or in combination with other dark pigments. In the instances where carbon black will be the sole dark pigment or colorant, it will tend to quench the fluorescence to an extent, but this may be advantageous in some circumstances where the phosphorescence is not also quenched. When employed, the carbon black will typically comprise less than about 5%, e.g., about 1 to 3%, of the ink.

The second colorant will also preferably include one or more appropriately colored water soluble dyes as described, for example, in the aforementioned U.S. Pat. No. 6,827,769. Among these are blue dyes, such as acid and direct dyes purified for ink jet use such as CI Acid Blue 9, Duasyn Blue FRL-SF (Direct Blue 199), Projetfast Cyan 2, Direct Blue 307 or any blue dye with an extinction coefficient higher than 10,000 soluble in water. The dye can also be one of the dyes mentioned above, selected to provide a desired color, shade or hue in the visible range, while providing suitable darkness in the printed ink to maintain readability and suitable fluorescence to provide machine readability.

In addition to the described colorants and equivalents, the ink compositions effective in the process of the invention will contain an aqueous liquid vehicle comprising water and a water-soluble vehicle in sufficient amounts to achieve an ink viscosity and surface tension effective for application of the ink to a substrate in a predetermined pattern by ink jet printing. Typical of these components are those described in the above noted patent publications, which are hereby incorporated by reference. The ink carrier for the colorants used in these ink compositions contains at least 65% water.

Fluorescence stabilizers can be employed in concentrations effective for maintaining (sometimes by enhancing fluorescence) the constant fluorescence level. Since the fluorescence of low viscosity inks can decrease as the ink penetrates the paper, it is preferred to include an additive effective to help maintain a constant level of fluorescence. The following solvents can provide enhancement of fluorescence: N,N-Dimethylacetamide, sulfolane, formamide, methylphenyl sulfoxide, N-Methylpyrrolidinone, 4-Methylmorpholine-N-oxide (MMNO), dimethylsulfoxide (DMSO), and the like. All of these solvents have the characteristic of a dipolar aprotic solvent with a high dielectric constant (>ca. 20) or high value of Hildebrand solubility parameter ($\delta$>10 MPa$^{1/2}$).

From this list, the 4 methylmorpholine-N-oxide (MMNO) had the best ability to achieve long term increased fluorescence, has no fluorescence quenching tendency and is a hygroscopic high boiling solid when pure. (It is typically supplied as 50-60% aqueous solution.) The MMNO is a known solvent for cellulose and aids penetration into the fibers of the paper, which may increase the fluorescence in a selective and long lasting manner. Polar low molecular weight resins (PLMWR) are of benefit to enhance and stabilize the fluorescence, in many cases to a lesser extent and by a different mechanism that the FS materials described above. Polar resins such as polyvinylpyrrolidone (MW 15000) and polyethyleneglycols are beneficial. Other water-soluble resins with good solvent characteristics for polar dyes are: polyvinylalcohol, poly N,N-dimethylhydantoin, polyacrylates, etc.

Glycol ethers, such as BTG (Triethylene Glycol Mono Butyl Ether), can have multiple beneficial effects such as: bridging between the water and other organic solvents, enhancing the color and fluorescence by internal hydrogen bonding, and improved penetration into the paper. The most efficient glycol was the BTG. Among suitable glycols that could be used are as following: triethylene glycol n-Butyl Ether (BTG), tripropylene glycol methyl ether (TPM), diethylene glycol n-butyl ether (DB), diethylene glycol methyl ether (DM), dipropylene glycol methyl ether (DPM), and the like.

Amines such as triethanol amine, ethanol amine, diethanolamine, trisopropanolamine, butyldiethanolamine, N,N dimethylethanolamine, N,N diethylethanolamine, N,N dipropylethanolamine, and the like can be useful in preventing the aggregation of the dyes, the evaporation during drying as a fugitive counterion and thus providing improved waterfastness as well as for improved solubility in water/glycol/ether mixtures. The amine helps also in maintaining constant viscosity during long periods of rest as well as fluidity and easy redispersibility. In addition, the amine does not cause clogging of nozzles during printing or at the time of restarting after interruption of printing, thus maintaining high ejection stability.

The images provided by the invention have easily detectable, preferably readable, visible and fluorescent images. The visible images are clear to normal human sight and effective for use with various image-reading machines operable for light in the visual range. The images are also sufficiently fluorescent, despite quenching due to the presence of colored dyes or pigments, to provide machine-readable fluorescent images which are substantial negatives of the visible images. Desirably, within the spectral range of interest (SROI), e.g., from 390 to 680 nm (visible range), the ink reflectance is less than 50% of the paper reflectance.

The preferred inks will be capable of imagewise application by ink jet printing and of providing machine-readable images when exposed to visible and fluorescent-exciting radiation. For an ink to be effectively used by ink jet printing, it must have a suitably low viscosity, yet have sufficient solids for it to achieve sufficient fluorescence and visible light reflectance to provide discernable images when dried. Preferably, the dry inks will provide machine-readable images on a wide variety of substrates.

The preferred inks will contain an aqueous liquid vehicle comprising water and a water-soluble vehicle in sufficient amounts to achieve an ink viscosity and surface tension effective for application of the ink to a substrate in a predetermined pattern by ink jet printing. Viscosities will typically be less than about 15 cps. For thermal ink jet printing, the viscosity should be within the range of from 1 to 5 cps when measured Haake Viscotester at 25° C., preferably from 2 to 4 cps, and exhibit a surface tension of from 20 to about 80 dyne/cm when measured by Fisher Surface Tensiomat at 25° C., preferably from 30 to 50 dyne/cm. For ink jet printing by piezoelectric means, the viscosity should be within the range of from 1.5 to 15 cps when measured by the above method, preferably from 2 to 12 cps.

The preferred inks will have a visual dark color (neutral black), a red-fluorescent signal and a red phosphorescent signal, when excited with UV light short or long wavelength. The print contrast signal PCS (also, PCR) is preferably greater than 0.35, for white and kraft papers with the red or green filters, when measured with the Envelope Reflectance Meter from the USPS. For white paper with red filter, values of greater than 0.45 are desired, e.g., 0.48 and above, e.g., 0.48-0.6, and essentially the same values with a green filter. For kraft paper, it is preferably greater than 0.35, e.g., 0.37-0.5 for a green filter and 0.45 and above, e.g., 0.43-0.6, with a red filter. The test methodology for this and other data referred to herein is described, for example, in the aforementioned U.S. Pat. No. 6,827,769.

The PRD is preferably greater than 0.25 for white and kraft paper with the red and green filters. For white paper with a red filter, it can be 0.60 and above and 0.55 and above for a green filter. For kraft paper with a red filter, it can be 0.30 and above and 0.25 and above for a green filter. The optical density of the visible component is therefore high enough to allow automatic scanning using an OCR scanner or the like. The fluorescent component is suitable for use by the facing equipment to orient the mail and, preferably, to discriminate from green phosphorescent stamps. The emissions are in the wavelength range of 580-640 nm when excited by UV light. The fluorescent intensity should be at least 7 PMU and for examples is in the range of (39-69) Phosphor Meter Unit (PMU) for solid printed areas and 50 to 98 PMU for drawdowns, the fluorescent component can be carried by the solvent (carrier) into the substrate and provide adequate fluorescent signal intensity.

In another process aspect, the invention provides a method, such as is illustrated in FIG. 3, which shows a process flow diagram illustrating one preferred process sequence. In general the process begins, at step 300, by printing on a document a covert optical code image having a target area and a data field, the target area being printed with luminescent ink, such as the aforementioned black fluorescent ink, the data field being printed in black ink. The reading part of the process begins, at step 310, by illuminating the document carrying the printed visible image with ultraviolet light. At step 320, the illuminated image is read with a fluorescence detecting reader. At step 330, a detected fluorescent image is compared to a reference image. At step 340, a determination is made whether the detected image matches the reference image. At step 350, if the detected fluorescent image matches the reference image, then that image is set as the target area and at least a predetermined area of the document is illuminated. At step 360, any image appearing in a fixed position relative to the target area is read. At step 370, a signal based on the data obtained from the read image is generated. If fluorescent image is not detected or does not match a reference image, then it can be rejected as an unauthentic, e.g., simple copy image.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

The invention claimed is:

1. A process for reading an optical code comprising a finder pattern which defines a target area and a pattern of symbology defining a data field in fixed position relative to the target area, wherein the finder pattern comprises a distinctive pattern and at least a predetermined portion thereof is printed in a luminescent ink having a predetermined visible color, and the symbology defining said data field is printed in an a non-luminescent ink of the same visible color as the finder pattern, the process comprising the steps of:
   (a) illuminating a document carrying a printed visible image with ultraviolet light;
   (b) reading the illuminated image with a fluorescence detecting reader;
   (c) comparing a detected fluorescent image to a reference image;
   (d) determining if the detected image matches the reference image;
   (e) if the detected fluorescent image matches the reference image, then setting that image as the target area and illuminating at least a predetermined area of the document; and
   (f) reading any image appearing in a fixed position relative to the target area.

2. A process according to claim 1, including the step: if the detected fluorescent image does not match the reference image, then rejecting the image or repeating the procedure for another position on the document.

3. A process according to claim 1, including the step of: if the detected fluorescent image matches the reference image, declaring the optical code as authentic and not a simple copy.

* * * * *

UNITED STATES PATENT AND TRADEMARK OFFICE
CERTIFICATE OF CORRECTION

PATENT NO. : 7,584,891 B2 Page 1 of 1
APPLICATION NO. : 11/311054
DATED : September 8, 2009
INVENTOR(S) : Auslander et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Fourteenth Day of September, 2010

David J. Kappos
*Director of the United States Patent and Trademark Office*